United States Patent
Yun

(10) Patent No.: US 11,250,843 B2
(45) Date of Patent: Feb. 15, 2022

(54) SPEECH RECOGNITION METHOD AND SPEECH RECOGNITION DEVICE

(71) Applicant: LG Electronics Inc., Seoul (KR)

(72) Inventor: Hwan Sik Yun, Seoul (KR)

(73) Assignee: LG Electronics Inc., Seoul (KR)

( * ) Notice: Subject to any disclaimer, the term of this patent is extended or adjusted under 35 U.S.C. 154(b) by 183 days.

(21) Appl. No.: 16/567,914

(22) Filed: Sep. 11, 2019

(65) Prior Publication Data

US 2020/0005774 A1 Jan. 2, 2020

(30) Foreign Application Priority Data

Jul. 30, 2019 (KR) .................. 10-2019-0092634

(51) Int. Cl.
| | |
|---|---|
| *G10L 15/197* | (2013.01) |
| *G10L 15/22* | (2006.01) |
| *G10L 15/02* | (2006.01) |
| *G10L 15/187* | (2013.01) |

(52) U.S. Cl.
CPC ............ *G10L 15/197* (2013.01); *G10L 15/02* (2013.01); *G10L 15/187* (2013.01); *G10L 15/22* (2013.01)

(58) Field of Classification Search
CPC ..... G10L 15/197; G10L 15/02; G10L 15/187; G10L 15/22
See application file for complete search history.

(56) References Cited

U.S. PATENT DOCUMENTS

| | | | | |
|---|---|---|---|---|
| 2003/0036903 A1* | 2/2003 | Konopka | .............. | G10L 15/065 704/249 |
| 2012/0095766 A1* | 4/2012 | Han | ............ | G10L 15/197 704/255 |
| 2016/0253989 A1* | 9/2016 | Kuo | ............ | G10L 15/183 704/257 |
| 2018/0277143 A1* | 9/2018 | Song | ............ | G10L 15/16 |
| 2020/0105262 A1* | 4/2020 | Abhinav | ............. | G10L 15/02 |
| 2020/0168208 A1* | 5/2020 | Mitra | ............ | G10L 15/075 |

FOREIGN PATENT DOCUMENTS

| | | |
|---|---|---|
| KR | 100998567 | 11/2010 |
| KR | 1020140022320 | 2/2014 |

* cited by examiner

*Primary Examiner* — Paras D Shah
*Assistant Examiner* — Darioush Agahi
(74) *Attorney, Agent, or Firm* — Fish & Richardson P.C.

(57) ABSTRACT

Disclosed are a speech recognition method capable of communicating with other electronic devices and an external server in a 5G communication condition by performing speech recognition by executing an artificial intelligence (AI) algorithm and/or a machine learning algorithm. The speech recognition method may comprise performing speech recognition by using an acoustic model and a language model stored in a speech database, determining whether the speech recognition of the spoken sentence is successful, storing speech recognition failure data when the speech recognition of the spoken sentence fails, analyzing the speech recognition failure data of the spoken sentence and updating the acoustic model or the language model by adding the recognition failure data to a learning database of the acoustic model or the language model when the cause of the speech recognition failure is due to the acoustic model or the language model and machine-learning the acoustic model or the language model.

16 Claims, 7 Drawing Sheets

SPEECH RECOGNITION METHOD AND SPEECH RECOGNITION DEVICE

CROSS-REFERENCE TO RELATED APPLICATION

This application claims benefit of priority to Korean Application No. 10-2019-0092634, filed on Jul. 30, 2019, the entire disclosure of which is incorporated herein by reference.

BACKGROUND

1. Technical Field

The present disclosure relates to a speech recognition method and a speech recognition device, and more particularly, to a speech recognition method and a speech recognition device capable of improving speech recognition accuracy by analyzing a cause of a speech recognition failure when the speech recognition fails.

2. Description of Related Art

As technology continues to advance, various services using a speech recognition technology have been introduced in a number of fields in recent years. A speech recognition technology can be understood as a series of processes of understanding utterances spoken by a speaker and converting the spoken utterance to text data recognizable and usable by computers. Furthermore, the speech recognition services using such a speech recognition technology may include a series of processes for recognizing user's spoken utterance and providing a service appropriate thereto.

An evolution method of a general speech recognition model is a method of gradually improving recognition failure data by including it in the learning. However, even though the cause of recognition failure is due to the language model, acoustic model learning is added or vice versa, an amount of data that does not help in improving the performance is increased to affect data balancing and thus the performance may be deteriorated.

In a related art, there is disclosed that whenever speech recognition for a recognition object fails, a speech recognition device of an electronic device stores user pronunciation information on the user's speech inputted to the recognition object and matches the user pronunciation information with the highest frequency among the stored user pronunciation information for the recognition object. When using a user's own pronunciation in addition to standardized pronunciation, such as using a dialect or pronunciation of a foreign language, the speech recognition success rate is improved by adding pronunciation information about the user's pronunciation to a recognition dictionary, and since the cause of the recognition failure is not analyzed, there is a limit to improving the speech recognition accuracy.

In a related art, disclosed is a technique including requesting data related to a language model from an external electronic device connected via a network, receiving data related to the language model from an external electronic device, and updating the language model stored in a speech database based on the received data. However, by requesting the language model data and updating the language model, there is a limit to improving the speech recognition accuracy because the cause of speech recognition failure is not analyzed and the acoustic model update is not considered.

The background art described above may be technical information retained by the present inventors in order to derive the present disclosure or acquired by the present inventors along the process of deriving the present disclosure, and thus is not necessarily a known art disclosed to the general public before the filing of the present application.

SUMMARY OF THE INVENTION

An aspect of the present disclosure is to solve the problem of the related art that since it is not possible to determine whether the cause of the recognition failure is due to an acoustic model or a language model, an amount of data that does not help in improving the performance is increased, which affects data balancing, and the performance is deteriorated.

An aspect of the present disclosure is to analyze a cause of speech recognition failure by using recognition failure data when a speech recognition error occurs.

An aspect of the present disclosure is to calculate an entropy for an output value of an acoustic model and to analyze the cause of speech recognition failure.

An aspect of the present disclosure is to evolve an acoustic model and a language model by analyzing whether the cause of the speech recognition failure is due to the acoustic model or the language model.

An aspect of the present disclosure is not limited to the above-mentioned aspects, and other aspects and advantages of the present disclosure, which are not mentioned, will be understood through the following description, and will become apparent from the embodiments of the present disclosure. In addition, it will be appreciated that the aspects and advantages of the present disclosure will be easily realized by those skilled in the art based on the appended claims and a combination thereof.

A speech recognition method according to an embodiment of the present disclosure may analyze speech recognition failure data to determine whether the cause of the failure is due to an acoustic model or a language model.

Specifically, the speech recognition method according to an embodiment of the present disclosure may include receiving a spoken sentence speech spoken by a user, performing speech recognition using an acoustic model and a language model stored in a speech database, determining whether the speech recognition is successful, storing speech recognition failure data when the speech recognition fails, analyzing the speech recognition failure data to determine whether a cause of the speech recognition failure is due to the acoustic model or the language model, and updating the acoustic model by adding the recognition failure data to a learning database of the acoustic model when the cause of the speech recognition failure is due to the acoustic model and machine-learning the acoustic model based on the added learning database of the acoustic model and updating the language model by adding the recognition failure data to a learning database of the language model when the cause of the speech recognition failure is due to the language model and machine-learning the language model based on the added learning database of the language model.

Through the speech recognition method, the cause of the speech recognition failure may be analyzed and thus the speech recognition failure data may be used to improve the speech recognition performance.

A speech recognition device according to an embodiment of the present disclosure may include a speech inputter for receiving a spoken sentence speech spoken by a user, a speech recognizer for performing speech recognition using an acoustic model and a language model stored in a speech database, a recognition failure cause analyzer configured to analyze whether a cause of the recognition failure is due to the acoustic model or the language model when the speech recognition fails, and a controller configured to control the acoustic model or the language model of the speech recognizer of the speech recognizer to be updated based on the analyzed speech recognition failure cause.

The recognition failure cause analyzer may include a speech recognition success determiner configured to determine whether speech recognition has been successful in the speech recognizer, a speech recognition failure cause analyzer configured to store speech recognition failure data in the failure of the speech recognition and determine whether the failure cause is due to the acoustic model or the language model by analyzing the speech recognition failure data, an acoustic model learner configured to add the recognition failure data to a learning database of the acoustic model and learn the acoustic model based on the added learning database of the acoustic model when the speech recognition failure cause is present in the acoustic model, and a language model learner configured to add the recognition failure data to a learning database of the language model and learn the language model based on the added learning database of the language model when the speech recognition failure cause is present in the language model.

In another embodiment of the present disclosure, the speech recognizer may calculate a score for determining a final result among a plurality of speech recognition result candidates by multiplying a score of the acoustic model by a weight and then adding a score of the language model, and the speech recognition failure cause analyzer may include at least one of a failure cause analyzer through searching a minimum weight of the acoustic model or a failure cause analyzer through measuring reliability of the acoustic model.

The failure cause analyzer through searching the minimum weight of the acoustic model may be configured to change weights for a score of the acoustic model, re-extracts speech recognition results, calculates speech recognition error rates of the re-extracted speech recognition results, determines whether an error rate is the minimum, determines an acoustic model score weight of which the error rate is the minimum, and compare the determined score weight with a previously set score weight to determine whether the error is due to the acoustic model or the language model. Further, the failure cause analyzer through measuring the reliability of the acoustic model may calculate an output of an acoustic model representing a probability distribution in each class for a given input value of the acoustic model, calculate an entropy for the output value every frame input to measure the reliability of the acoustic model, calculate an average of the calculated entropies, and compare whether the average of the calculated entropies is larger than a threshold to determine whether the failure cause is an error due to the language model or an error due to the acoustic model.

Other than the aforementioned, there may be provided processes and systems for implementing the present disclosure, and computer programs for implementing such processes.

Advantages and features of the present disclosure and methods of achieving the advantages and features will be more apparent with reference to the following detailed description of example embodiments in connection with the accompanying drawings.

According to an embodiment of the present disclosure, it is possible to improve the speech recognition performance by analyzing the cause of the speech recognition failure, adding the speech recognition failure data to the acoustic model or the language model database, and learning by the speech recognition method.

In addition, by adding the speech recognition failure data to the acoustic model or language model database, machine learning, and then confirming whether the speech recognition performance is improved by the speech recognition performaner, and updating the acoustic model and the language model of the existing speech recognizer only when the speech recognition performance is improved, it is possible to construct an evolutionary system that determines which model an error is caused by and learns the speech recognition model.

Further, it is possible to improve the performance of the speech recognition failure cause analyzer using a plurality of speech recognition failure cause analyzers.

The above-mentioned embodiments of the present disclosure may be implemented as a computer program executable by various components on a computer, and such the computer program may be recorded in a computer-readable medium.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
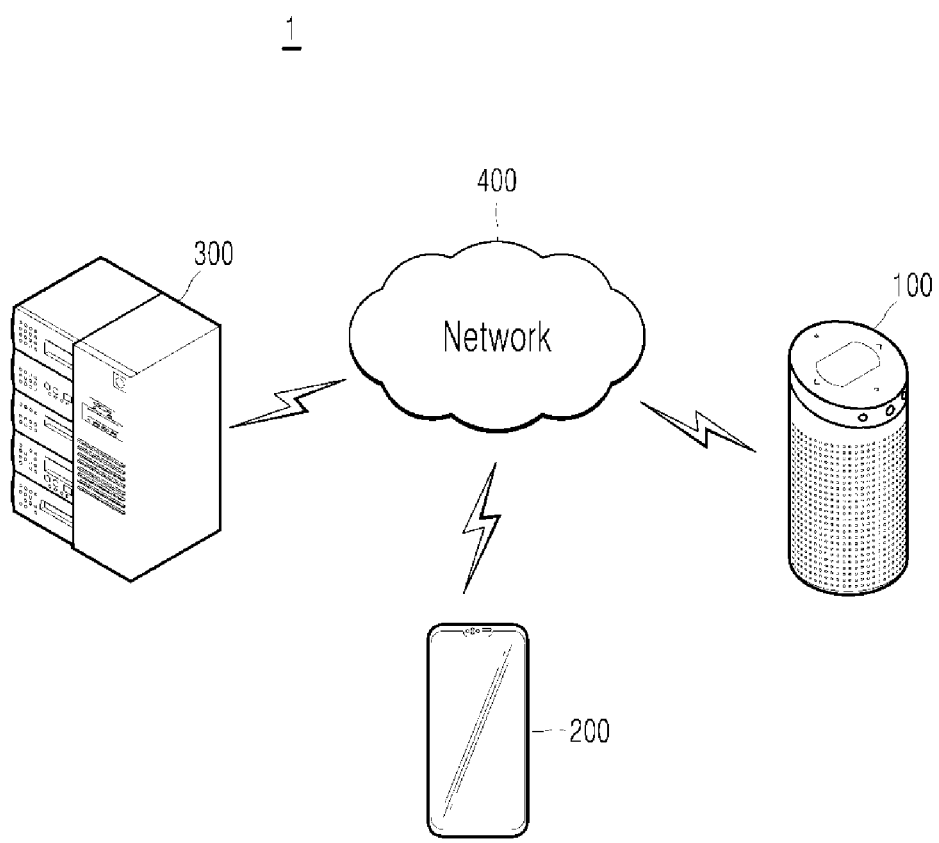
FIG. 1 is a diagram illustrating a speech recognition condition according to an embodiment of the present disclosure, including a speech recognition device, a user terminal, a server, and a network connecting the speech recognition device, the user terminal, and the server to one another.

Advantages and features of the present disclosure and methods for achieving them will become apparent from the descriptions of aspects herein below with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Although the terms first, second, etc. may be used herein to describe various elements, these elements should not be limited by these terms. These terms may be only used to distinguish one element, component, region, layer, or section from another region, layer, or section.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is a diagram illustrating a speech recognition condition according to an embodiment of the present disclosure, including a speech recognition device, a user terminal, a server, and a network connecting the speech recognition device, the user terminal, and the server to one another.

FIG. 1 illustrates a state in which a speech recognition device 100, a user terminal 200, and a server 300 are communicatively connected to one another via a network 400. The speech recognition device 100 includes a communicator (110 in FIG. 3) that enables to transmit and receive data to and from the server 300 and the user terminal 200 corresponding to a personal communication device via the network 400 which may be wire-based or wireless.

The speech recognition device 100, the user terminal 200, and the server 300 may be connected to one another in a 5G communication environment. In addition, various electronic devices, which can be used at home or office, other than the ones illustrated in FIG. 1 may be connected to each other in an Internet-of-Things environment and operate.

The speech recognition device 100 may receive a spoken utterance from a user and provide a speech recognition service through recognition and analysis of the spoken utterance. The speech recognition device 100 may include an artificial intelligence (AI) speaker and act as a hub controlling an electronic device that does not have speech input/output functionality.

Here, the spoken utterance may include a wake-up word, and a spoken sentence that is a continuous word, not the wake-up word. The wake-up word is a designated command that activates the speech recognition functionality of the speech recognition device 100 and is herein referred to as "wake-up word". The speech recognition functionality is activated only when the wake-up word is contained in the spoken utterance, and therefore, when the spoken utterance does not contain the wake-up word, the speech recognition functionality remains in an inactive state (for example, in a sleep mode). Such a wake-up word may be preset and stored in a memory (180 in FIG. 3) that will be described later.

Also, a spoken sentence refers to the portion of a spoken utterance that is processed after the speech recognition functionality is activated, and may include a speech command that the speech recognition device 100 can actually process and generate output from. For example, when the user's spoken utterance is "Eeoseutaya eeokeoneul kyeojwo (Airstar, turn on the air conditioner)", the wake-up word in this case would be "Eeoseutaya (Airstar)", and the spoken sentence would be "eeokeoneul kyeojwo (turn on the air conditioner)". In this case, the speech recognition device 100 may receive and analyze the spoken utterance, determine whether the wake-up word is present therein, and execute the spoken sentence, thereby controlling an air conditioner (not illustrated) as an electronic device.

In the present example embodiment, the spoken sentence may be a unit for containing a single speech command. In a case when the spoken sentence contains a single speech command, the wake-up word may be positioned before the spoken sentence, may be positioned after the spoken sentence, or may be positioned within the spoken sentence. When the wake-up word is positioned within the spoken sentence, the spoken sentence may include two or more spoken segments. For example, when the user's spoken utterance is "Eeoseutaya eeokeoneul kyeojwo (Airstar, turn on the air conditioner)", the wake-up word in this case would be "Eeoseutaya (Airstar)", and the spoken sentence would be "eeokeoneul kyeojwo (turn on the air conditioner)". In this case, the spoken sentence may include a first spoken segment "Eeokeoneul (the air conditioner)" preceding the wake-up word, and a second spoken segment "kyeojwo (turn on)" following the wake-up word. Without the wake-up word positioned within the spoken sentence, the first spoken segment preceding the wake-up word and the second spoken segment following the wake-up word may be combined together to form the spoken sentence which serves as a single speech command.

In a non-limiting example embodiment, the spoken sentence may include two or more speech commands. In a case when the spoken sentence includes two or more speech commands, the wake-up word may be positioned between a first spoken sentence and a second spoken sentence; may be positioned before the first spoken sentence; may be positioned after the first spoken sentence (thereby preceding the second spoken sentence); or may be positioned within the first spoken sentence; may be positioned after the second spoken sentence; or may be positioned within the second spoken sentence. For example, given "Eeokeoneul kyeojwo eeoseutaya geurigo cheongjeong modeuro unjeonhaejwo (Turn on the air conditioner, Airstar, and drive it in clean mode)" as the spoken utterance, the wake-up word "eeoseuta (Airstar)" is positioned between the first spoken sentence "Eeokeoneul kyeojwo (turn on the air conditioner)" and the second spoken sentence "geurigo cheongjeong modeuro unjeonhaejwo (and drive it in clean mode)". Without the wake-up word positioned between the two spoken sentences, the first spoken sentence preceding the wake-up word and the second spoken sentence following the wake-up word may be individually processed, and the processing results may be outputted; or the first spoken sentence preceding the wake-up word and the second spoken sentence following the wake-up word may be batch processed, and the processing results may be outputted.

In the present embodiment, the speech recognition device 100 may convert a series of spoken utterance signals into texts and extract a conflicting entity name that conflicts with a dominant domain inferred from the converted texts. The speech recognition device 100 may calculate probability for a word candidate group of the conflicting entity name based on calculation of a distance between the word representing the dominant domain and the conflicting entity name, and select the conflicting entity name in the text as one word candidate of the word candidate group of the conflicting entity name based on the calculated probability.

In the present embodiment, the spoken utterance signal may include a continuous word as a speech command word in a state in which the speech recognition functionality is activated after the recognition of the wake-up word is successful. Furthermore, in the present embodiment, the spoken utterance signal may include a spoken sentence as an utterance spoken freely by the user other than the speech command word in a state in which the speech recognition functionality is activated after the recognition of the wake-up word is successful. Furthermore, in the present embodiment, the spoken utterance signal may also include a wake-up word and a spoken sentence before the recognition of the wake-up word.

The user terminal 200 may control driving of the speech recognition device 100 through the server 300. Furthermore, the user terminal 200 may receive, from the speech recognition device 100, various messages regarding an operation of the speech recognition device 100. Such messages, in terms of the type, include but are not limited to a notification message indicating the start and/or end of speech recognition processing of the speech recognition device 100, an alarm message indicating an occurrence of abnormal situation within the speech recognition device 100, and so forth. These notification message and/or alarm message may be transmitted and outputted simultaneously through a user interface (not illustrated) of the speech recognition device 100 and the user terminal 200.

The user terminal 200 may include a communication terminal capable of performing functions of a computing device (not illustrated), and may include, but is not limited to, a user-operable desktop computer, a smartphone, a notebook computer, a tablet PC, a smart TV, a mobile phone, a personal digital assistant (PDA), a laptop computer, a media player, a micro server, a global positioning system (GPS) device, an E-book reader, a digital broadcasting terminal, a navigation system, a kiosk information system, an MP3 player, a digital camera, a home appliance, and any other mobile or immobile computing devices. Furthermore, the user terminal 200 may be a wearable terminal having a communication function and a data processing function, such as a watch, glasses, a hair band, a ring, or the like. The user terminal 200 is not limited to the aforementioned items, but may be any terminal capable of web-browsing.

The server 300 may be a database server which provides big data required for applications of various artificial intelligence algorithms, data on speech recognition, and the like. Furthermore, the server 300 may include a web server or application server that enables remote control of the speech recognition device 100 by using an application or web browser installed on the user terminal 200.

Artificial intelligence is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than executing rigidly-set static program commands, may take an approach that builds a specific model based on input data for deriving a prediction or decision.

The server 300 may convert a series of spoken utterance signals received from the speech recognition device 100 into text, extract a conflicting entity name that conflicts with a dominant domain inferred from the converted text, and calculate a probability for a word candidate group of the conflicting entity name based on calculation of a distance between the word representing the dominant domain and the conflicting entity name, select the conflicting entity name in the text as one word candidate of the word candidate group of the conflicting entity name based on the calculated probability, and transmit the selected result to the speech recognition device 100. In other words, speech recognition processing processes may be performed by the server 300.

According to the processing capability of the speech recognition device 100, at least some of the text conversion, the extraction of the conflicting entity name, probability calculation, and the candidate selection described above may be performed by the speech recognition device 100.

The network 400 may serve to connect the speech recognition device 100 and the user terminal 200 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. Furthermore, the network 400 may transmit/receive information using short-range communications and/or long-distance communications. The short distance communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, bridge, router, switch, and gateway. The network 400 may include one or more connected networks, for example, a multi-network environment, including a public network such as the Internet and a private network such as a secure corporate private network. Access to the network 400 may be provided via one or more wired or wireless access networks. Further, the network 400 may support 5G communication and/or an Internet of things (IoT) network for exchanging and processing information between distributed components such as objects.

Figure 2:
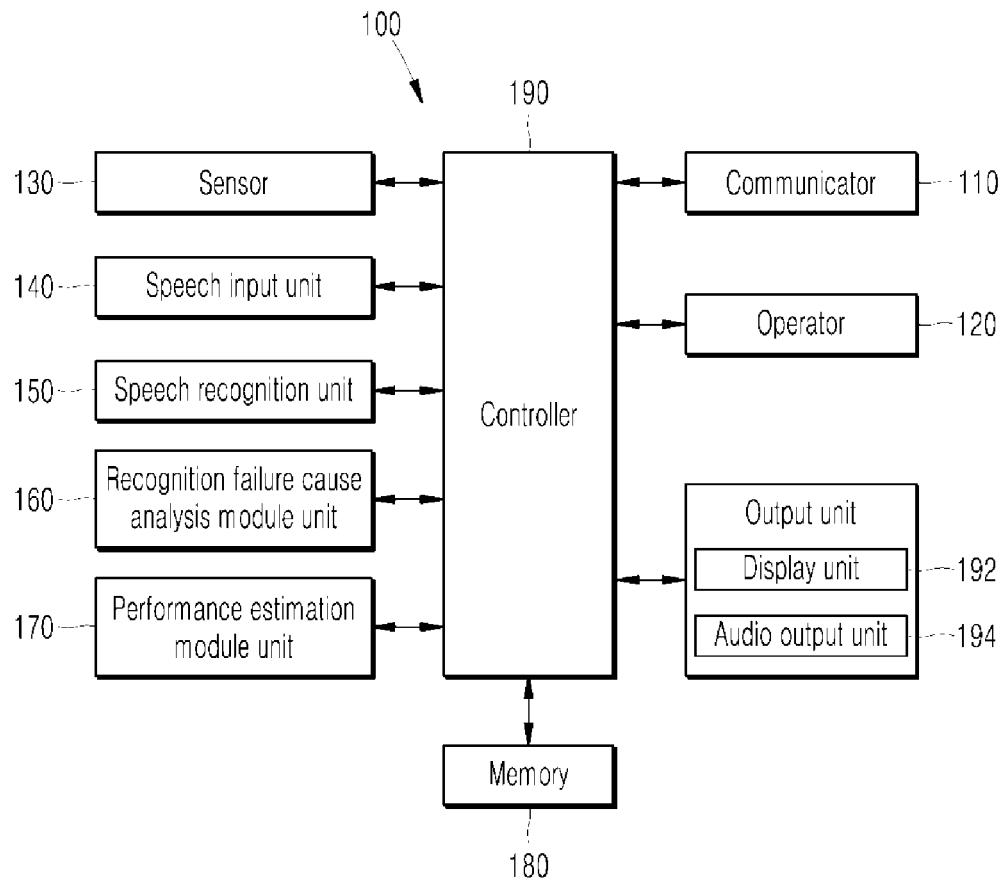
FIG. 2 is a schematic block diagram of a speech recognition device according to an embodiment of the present disclosure.

FIG. 2 is a schematic block diagram of a speech recognition device according to an example embodiment of the present disclosure. Descriptions which overlap with the above descriptions related to FIG. 1 are not provided below. Referring to FIG. 2, the speech recognition device 100 may include a communicator 110, an operator 120, a sensor 130 including a proximity sensor 131 and an image sensor 132, a speech inputter 140, a speech recognizer 150, a recognition failure cause analyzer 160, a performance estimator 170, a memory 180, a controller 190, a display 192, and an audio outputter 194.

The communicator 110 may provide a communication interface required for providing a transmission/reception signal between the speech recognition device 100 and another electronic device and/or the user terminal 200 in the form of packet data in cooperation with the network 400. Furthermore, the communicator 110 may serve to receive a predetermined information request signal from the electronic device and/or the user terminal 200, and transmit information processed by the speech recognition device 100 to the electronic device and/or the user terminal 200. The communicator 110 may be a device that includes hardware and software required for transmission/reception of signals such as control signals, data signals, and so forth, with other network devices through wire-based or wireless connections.

In the present embodiment, the another network device may refer to a home appliance not provided with speech input/output functionality, for example, an air conditioner, a refrigerator, a laundry machine, or the like, and this home appliance may be controlled using the speech recognition device 100. Further, the another electronic device may be a home appliance provided with speech input/output functionality, that is, a function of the speech recognition device 100.

The operator 120 may have a plurality of operable buttons (not illustrated) and may transmit a signal corresponding to an operated button to the controller 190. In the present example embodiment, the operator 120 may include first to fourth contact switches (not illustrated) and an exact process of processing an output signal of each contact switch may be determined by a program previously stored in the memory 180. For example, by an operation signal of the first contact switch or the second contact switch, menu items horizontally displayed on the display 192 may be selected; and by an operation signal of the third contact switch or the fourth contact switch, menu items vertically displayed on the display 192 may be selected. Also, the speech recognition functionality may be activated by operating one of the first to fourth contact switches.

The sensor 130 may include the image sensor 132 and the proximity sensor 131 configured to sense an environment around the speech recognition device 100. The proximity sensor 131 may acquire data on the location of an object (for example, a user) located around the speech recognition device 100 by using far-infrared rays or the like. Furthermore, user location data acquired by the proximity sensor 131 may be stored in the memory 180.

The image sensor 132 may include a camera (not illustrated) capable of capturing an image of the surrounding of the speech recognition device 100, and for image-capturing efficiency, a plurality of cameras may be provided therein. For example, each camera may include an image sensor (for example, a CMOS image sensor) which includes at least one optical lens and a plurality of photodiodes (for example, pixels) forming an image using the light passed through the optical lens, and may include a digital signal processor (DSP) for forming an image based on signals outputted from the photodiodes. The digital signal processor may generate not only a static image, but also a dynamic image formed of frames of static images. Meanwhile, the image captured and acquired by the camera serving as the image sensor 132 may be stored in the memory 180.

Although the sensor 130 is limited to the proximity sensor 131 and the image sensor 132 in the present example embodiment, the sensor 130 may also include various other sensors, such as a temperature sensor, a humidity sensor, a vibration sensor, etc., each capable of sensing a condition around the speech recognition device 100. Furthermore, information detected by the sensor 130 may be stored in the memory 180.

The speech inputter 140 may have inputted thereto a spoken utterance uttered by a user towards the speech recognition device 100. To this end, the speech inputter 140 may be provided with one or more microphones (not illustrated). Also, to enable more accurate reception of the spoken utterance, the speech inputter 140 may be provided with a plurality of microphones (not illustrated). Here, the plurality of microphones may be disposed in different locations by being spaced apart from each other, and may process the received spoken utterance into electrical signals.

In some embodiments, the speech inputter 140 may use various noise removing algorithms for removing the noise generated during the process of receiving the spoken utterance. In some embodiments, the speech inputter 140 may include various components for processing audio signals. For example, the speech inputter 140 may include a filter (not illustrated) which removes noise when receiving a spoken utterance, an amplifier (not illustrated) which amplifies signals outputted from the filter and outputs the same (the amplified signals), and the like.

The speech recognizer 150 may convert a series of spoken utterance signals input by the speech inputter 140 into text, and distinguish a wake-up word from a spoken sentence rather than the wake-up word in the spoken sentence speech from the converted text. The speech recognizer 150 distinguishes a wake-up word and a spoken sentence from the input spoken sentence speech, and performs speech recognition of both the wake-up word and the spoken sentence using the acoustic model 151 and the language model 152 stored in the speech database. Thereafter, the controller 190 executes a wake-up word or a spoken sentence corresponding to the text correction result processed by the speech recognizer 150, and may control the result to be output to the display 192 and/or the audio outputter 194. Hereinbelow, the speech recognizer 150 will be described in greater detail with reference to FIG. 3.

The memory 180 may include a volatile or non-volatile recording medium and have recorded various data required for operations of the speech recognition device 100. The recording medium is configured to store data readable by the controller 190, and may include a hard disk drive (HDD), solid state disk (SSD), silicon disk drive (SDD), ROM, RAM, CD-ROM, a magnetic tape, a floppy disk, a light data storage device, and the like. In the present embodiment, the information stored in the memory 180 will be described for each situation according to the context.

The memory 180 may store limited data. For example, a preset wake-up word for determining the presence of a wake-up word in the spoken utterance may be stored in the memory 180. The wake-up word may be set by the manufacturer. For instance, "Eeoseuta (Airstar)" may be set as the wake-up word, and may be later modified by a user.

The processing results of a spoken sentence processed by the controller 190 may be outputted through an outputter, and the outputter may include a display 192 and an audio outputter 194. The display 192 may display, as image, processing results, operation mode, operation status, error status, etc. corresponding to the spoken sentence within the spoken utterance. In some embodiments, the display 192 may include a touch screen which forms an interlayer structure with a touchpad. In this case, the display 192 may be utilized, not only as an output device, but also as an input device to which data can be inputted by a user's touch.

The display 192 may display a driving mode, a current state, and setting items of the speech recognition device 100, through various visual images, letters, numerals, and symbols, as well as through graphic images such as icons. Also, the display 192 may display information corresponding to each stage involved in the process of processing the inputted spoken utterance.

The audio outputter 194 may output an audio signal. For example, under control of the controller 190, the audio outputter 194 may output as audio, an alarm sound, notification messages regarding an operation mode, an operation status, an error status, etc., information corresponding to user's spoken sentence, processing results corresponding to user's spoken sentence, and the like. The audio outputter 194 may convert electric signals from the controller 190 into audio signals and output the converted audio signals. To this end, the audio outputter 180 may be provided with a speaker (not illustrated) or the like.

The controller 190 may control the display 192 to provide visual information corresponding to each stage of the speech recognition process and the process of controlling the electronic device, and may control the audio outputter 194 to provide audio information corresponding to each stage of the speech recognition process and the process of controlling the electronic device. In the present embodiment, the controller 190 may control to output the processing results of a spoken sentence isolated by the speech recognizer 150 through the display 192 and/or the audio outputter 194.

The controller 190 may be a central processing unit of a kind capable of driving a control software installed in the memory 180, controlling the display 192 and/or the audio outputter 194 to output the processing results of a spoken sentence, and other various functions. Here, the controller 190 may include any type of devices capable of processing data, such as a processor. Here, the term "processor" may represent, for example, a hardware-embedded data processing device having a physically structured circuit to execute functions expressed as instructions or codes included in a program. Examples of the hardware-embedded data processing device may include a microprocessor, a central processing unit (CPU), a processor core, a multiprocessor, an application-specific integrated circuit (ASIC), a field programmable gate array (FPGA), etc., but the scope of the present disclosure is not limited thereto.

In the present example embodiment, the speech recognition device 100 may perform machine learning, such as deep learning, on user's spoken utterance signals received, and the memory 180 may store data for use in machine learning, result data, and so on.

A deep learning technology, which is a type of machine learning, may perform learning to a deep level in stages on the basis of data. The deep learning may represent a set of machine learning algorithms for extracting essential data from a plurality of pieces of data with an increase in stages.

A deep learning structure may include an artificial neural network (ANN), and may be configured with, for example, a deep neural network (DNN) such as a convolutional neural network (CNN), a recurrent neural network (RNN), a deep belief network (DBN), or the like. The deep learning structure according to the present embodiment may use various structures well known in the art. For example, the deep learning structure according to the present disclosure may include a CNN, an RNN, a DBN, and the like. RNN is an artificial neural network structure which is formed by building up layers at each instance, and which is heavily used in natural language processing and the like and effective for processing time-series data which vary over a course of time. A DBN includes a deep learning structure formed by stacking up multiple layers of a deep learning scheme, restricted Boltzmann machines (RBM). A DBN has the number of layers formed by repeating RBM training. The CNN may include a model simulating a human brain function established on the assumption that when recognizing an object, a person extracts basic features of the objects, and then undergoes a complicated calculation in the brain to recognize the object on the basis of a result of the calculation.

Meanwhile, learning of an artificial neural network may be performed by adjusting a weight of a connection line (also adjusting a bias value if necessary) between nodes so that a desired output is achieved with regard to a given input. Also, the artificial neural network can continuously update the weight values through learning. Furthermore, methods such as back propagation may be used in training the artificial neural network.

As described above, the speech recognition device 100 may be provided with an artificial neural network and perform machine learning-based user recognition and user's speech recognition using received audio input signals as input data.

The acoustic model learner 165 and the language model learner 166 may include an artificial neural network, for example, a deep neural network (DNN) and train the DNN, and examples of the DNN include CNN, RNN, DBN, and so forth. Both unsupervised learning and supervised learning may be used as a machine learning method of the artificial neural network. The acoustic model learner 165 and the language model learner 166 may control a tone recognition artificial neural network structure after learning to be updated according to a setting.

Figure 3:
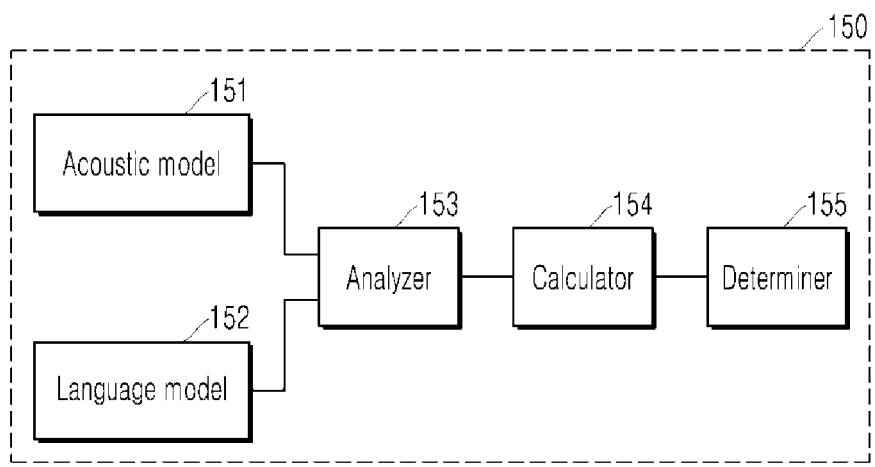
FIG. 3 is a schematic block diagram of a speech recognizer of the speech recognition device of FIG. 2.

FIG. 3 is a schematic block diagram of a speech recognizer of the speech recognition device of FIG. 2 according to an embodiment of the present disclosure. Descriptions which overlap with the above descriptions related to FIGS. 1 to 3 are not provided below. The speech recognizer 150 may convert a series of spoken utterance signals input by the speech inputter 140 into texts. Referring to FIG. 3, the speech recognizer 150 according to an embodiment may include an acoustic model 151, a language model 152, an analyzer 153, a calculator 154, and a determiner 155.

The analyzer 153 may extract a word candidate group by analyzing the pronunciation and the context of the spoken utterance signal input by the speech inputter 140 using the acoustic model 151 and the language model 152. Here, the word candidate group may include a plurality of individual word candidates.

Here, the acoustic model 151 may include a statistical model of speech produced by training how phonemes (i.e., speech units, e.g., words, syllables, triphones, or smaller parts of speech) are spoken based on data on a plurality of speaker speech. For example, the word 'mom' may include modeling how a sound is expressed, and the acoustic model 151 may be stored in the memory 180 and called during the speech recognition process. In an embodiment of the present disclosure, the acoustic model 151 may include at least one of a mel frequency cepstral coefficient (MFCC) extraction method as the most representative method of a method of estimating frequency domain energy, a perceptual linear prediction (PLP) method as the most representative method of a method of using a time-axial autocorrelation function, and a cepstral coefficient extraction method using a representative gammatone filter-bank (GTCC) of a time-frequency analysis method, and may include other acoustic models, but is not limited thereto.

In addition, the language model 152 may include an algorithm for finding regularity about a grammar, a phrase, a word, etc. in a natural language, and increasing the accuracy of an object to be searched using the regularity. In this case, a commonly used method is a statistical modeling technique for calculating a probability value, which may include a method of expressing a language rule as a probability in a spoken utterance signal input through a large corpus and limiting a search area through the probability value. In addition, in the speech recognition, there is an advantage in that the search space is dramatically reduced as well as accuracy. Since the probability distribution of all possible sentences is based on the probability model of the sentence, it may be necessary to learn the probability model from the learning data. In addition, N-Gram, which is a statistical language model in most language modeling applications, is known as the most successful language model, and even in the present disclosure, N-Gram may be preferably used. In the present embodiment, the language model 152 may also be stored in the memory 180 and called during the speech recognition process.

A technique of calculating probability values, which will be described later, is a technique commonly used in statistics or speech recognition techniques, and is a technique generally applied in topic models, opinion mining, text summaries, data analysis, and public opinion surveys, and thus it is obvious that those skilled in the art can fully understand the above meaning without describing a principle of calculating the probability values.

The calculator 154 may calculate a probability that the words included in the spoken utterance coincide with each of the word candidate groups extracted as a result analyzed by the analyzer 153.

The determiner 155 may determine a word candidate having the highest matching probability among the word candidate groups to convert the determined word candidate into text. For example, from the above description, the determiner 155 may extract a word (yeonghwa) having the highest probability of probabilities (yeonghwa-60%, yeongha-20%, yonghwa-10%, yeongwa-5%, yeonga-3%, yonga-2%) that each word candidate group coincides with a word "yeongha (below zero)" included in the spoken utterance.

The speech recognizer 150 multiplies a score (probability) of the acoustic model by a weight that determines the final result among the plurality of speech recognition result candidates (yeonghwa, yongha, yonghwa, yeongwa, yeonga, yonga), and then adds and calculates a score (probability) of the language model to output a result as a speech recognition candidate (yeonghwa) having the highest final score (yeonghwa-60%, yongha-20%, yonghwa-10%, yeongwa-5%, yeonga-3%, yonga-2%).

Figure 4:
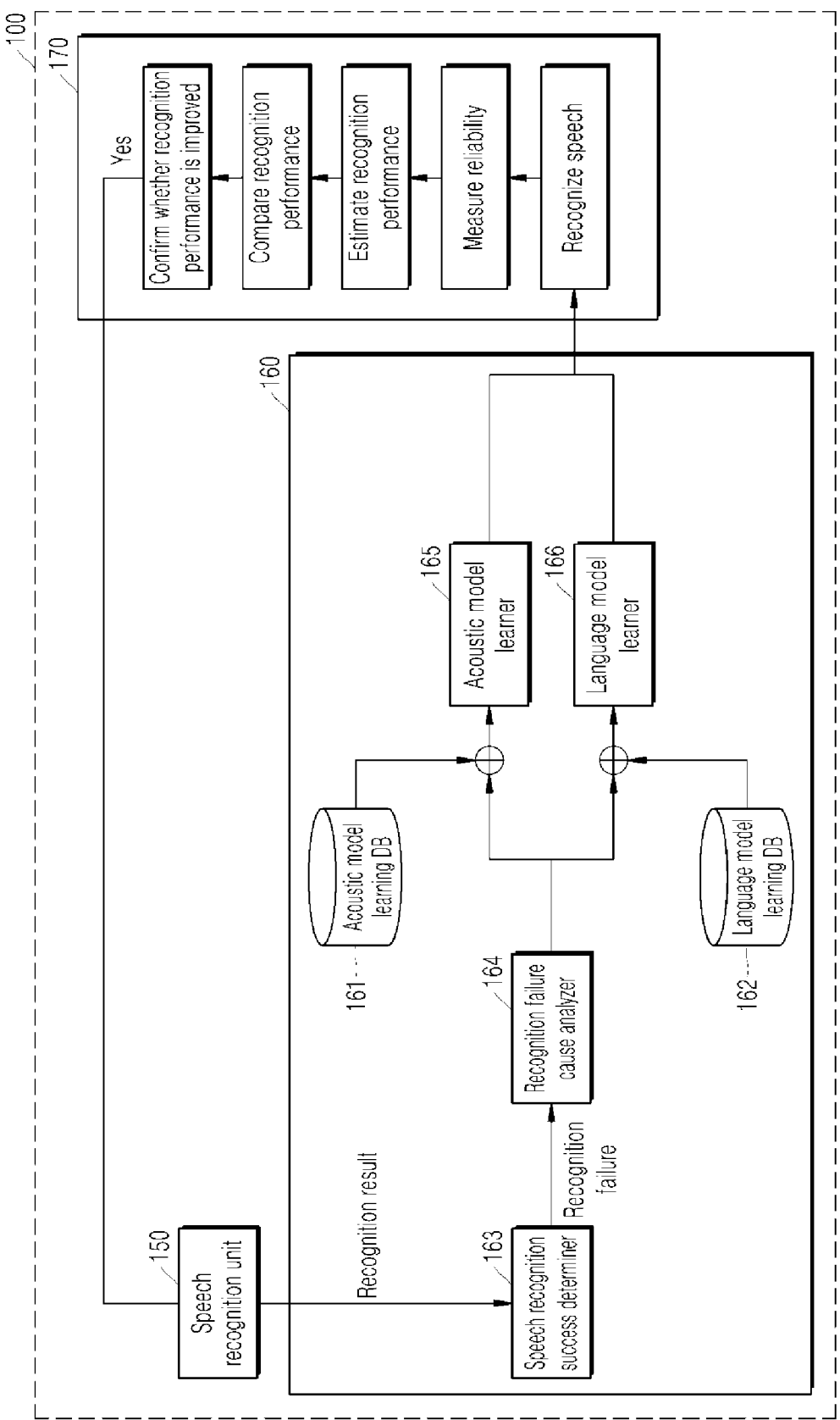
FIG. 4 is a diagram illustrating a recognition failure cause analyzer and a performance estimator for analyzing a failure cause of speech recognition of the speech recognition device according to an embodiment of the present disclosure.

FIG. 4 is a flowchart of analyzing a cause of speech recognition failure of the speech recognition device according to an embodiment of the present disclosure and a diagram illustrating a recognition failure cause analyzer and a performance estimator.

The speech recognition device 100 may include a speech inputter 140 for receiving a spoken utterance spoken by a user, a speech recognizer 150 for performing speech recognition using an acoustic model and a language model stored in a speech database, a recognition failure cause analyzer 160 which analyzes whether the cause of the recognition failure is present in the acoustic model and the language model at the time of failure of the speech recognition, and a performance estimator 170 which evaluates performance of the result of machine learning after analyzing the failure cause in the recognition failure cause analyzer 160.

The speech recognizer 150 distinguishes a wake-up word and a spoken sentence rather than the wake-up word from the input spoken sentence speech, and perform speech recognition with respect to both the wake-up word and the spoken sentence using the acoustic model 151 and the language model 152 stored in the speech database.

The recognition failure cause analyzer 160 may include a speech recognition success determiner 163, a speech recognition failure cause analyzer 164, an acoustic model learner 165, and a language model learner 166. The speech recognition success determiner 163 may determine whether speech recognition has been successful in the speech recognizer 150. The speech recognition failure cause analyzer 164 may store speech recognition failure data of the spoken sentence in the failure of the speech recognition of the spoken sentence and determine whether the failure cause is present in the acoustic model or the language model by analyzing the speech recognition failure data of the spoken sentence. When the speech recognition failure cause is present in the acoustic model 151, the recognition failure data is added to a learning database 161 of the acoustic model, and the acoustic model learner 165 may learn the acoustic model 151 based on the added learning database of the acoustic model. When the speech recognition failure cause is present in the language model 152, the recognition failure data is added to a learning database 162 of the language model, and the language model learner 166 may learn the language model 152 based on the added learning database of the language model.

In the present disclosure, the recognition failure cause analyzer 160 may analyze the speech recognition failure cause for both of the wake-up word and the spoken sentence and add and learn the speech recognition failure data to the learning database 161 of the acoustic model and the learning database 162 of the language model.

The model learned in the acoustic model learner 165 or the language model learner 166 of the recognition failure cause analyzer 160 may check whether to improve performance of recognition in the performance estimator 170 to update the acoustic model 151 and the language model 152 of the speech recognizer 150 only when the speech recognition performance has been actually improved.

In order to estimate performance of the speech recognition model learned by the acoustic model learner 165 or the language model learner 166 of the recognition failure cause analyzer 160, the performance estimator 170 may recognize a speech using the learned model, calculate reliability by measuring an entropy of the speech to be recognized, estimate or evaluate recognition performance for a newly learned model, and confirm whether the recognition performance is improved by comparing recognition performance for the newly learned model with recognition performance for an existing model.

When it is confirmed that the recognition performance is improved by comparing recognition performance for a newly learned model with recognition performance for an existing model, the speech recognition device 100 may include a controller 190 which controls the acoustic model 151 or the language model 152 of the speech recognizer of the speech recognizer 150 to be updated to a model learned in the acoustic model learner 165 or the language model learner 166.

As described above, the acoustic model learner 165 and the language model learner 166 may include an artificial neural network, for example, a deep neural network (DNN) such as CNN, RNN, DBN, and so forth and may learn the acoustic model and the language model through the learning database of the acoustic model and the learning database of the language model to which the recognition failure data is added via the DNN.

In an embodiment of the present disclosure, the acoustic model learner 165 and the language model learner 166 may learn themselves by accumulating data in various areas in order to technically normalize or adapt the language model or the acoustic model to apply a deep learning technology to build knowledge. The acoustic model learner 165 and the language model learner 166 may use a traditional hidden Markov model (HMM)-based speech recognition technology and a deep neural learning (DNN)-based speech recognition technology.

Figure 5:
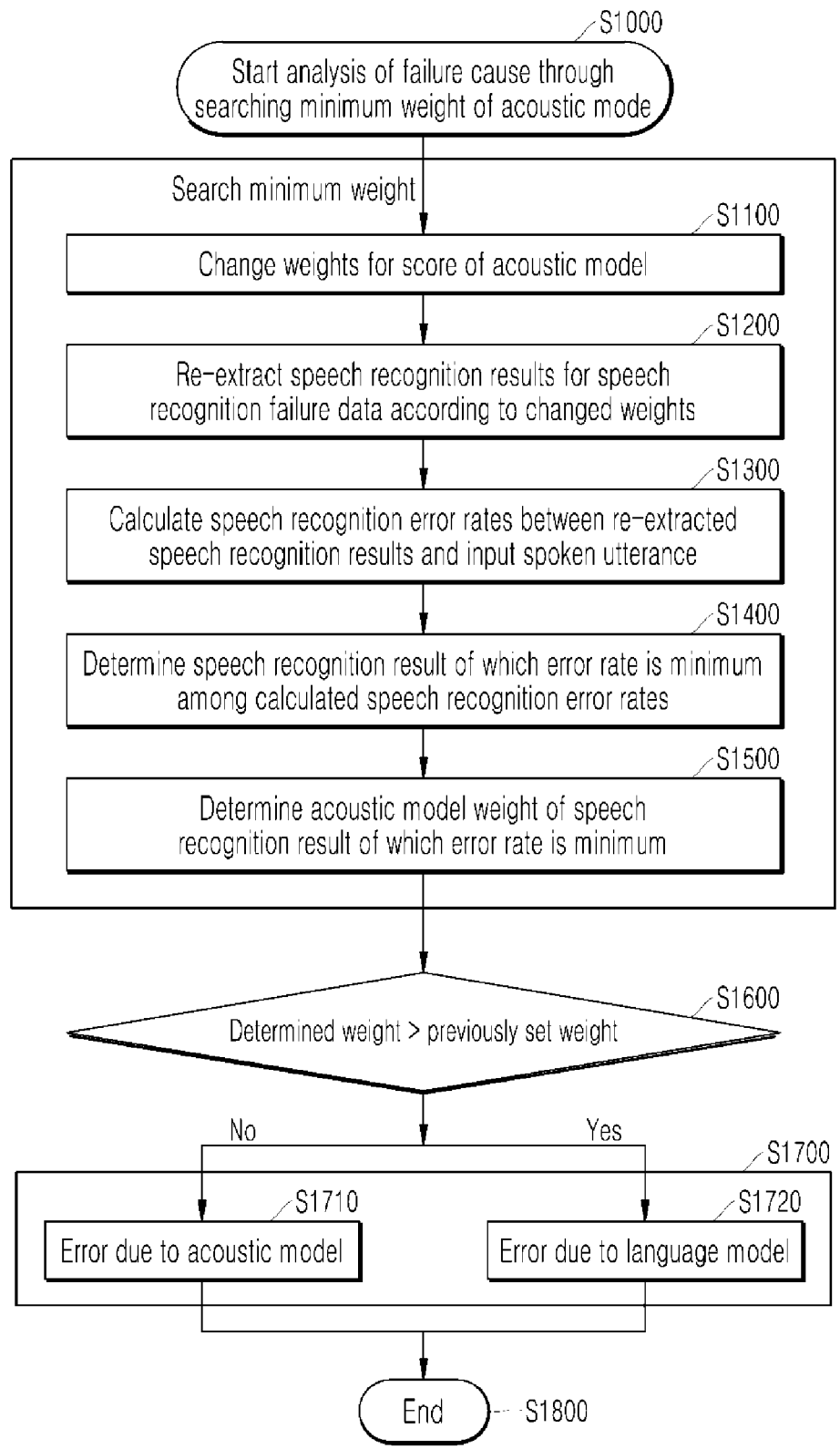
FIG. 5 is a flowchart of a method for analyzing a failure cause by searching a minimum weight of an acoustic model according to an embodiment of the present disclosure.

FIG. 5 is a flowchart of a method for analyzing a failure cause by searching a minimum weight of an acoustic model according to an embodiment of the present disclosure.

The speech recognizer 150 performs speech recognition, and selects a result of the highest final score among a plurality of speech recognition result candidates as a speech recognition result, in which the final score may be calculated by multiply a score of the acoustic model by a weight and then adding a score of the language model. In another embodiment, the score may be represented as a probability.

Speech Recognition Final Score=(Acoustic Model Score)×(weight)+(Language Model Score)

In the recognition failure cause analyzer 164, the analysis of the failure cause by searching a minimum weight of the acoustic model is started (S1000), and it is determined whether the cause of failure is present in the acoustic model 151 or the language model 152. To this end, the recognition failure cause analyzer 164 may perform a step of searching a minimum weight while changing weights in order to determine a weight at which a speech recognition error rate becomes the minimum (S1100 to S1500).

The searching of the minimum weight (S1100 to S1500) may include changing weights of the acoustic model (S1100), re-extracting speech recognition results for the speech recognition failure data according to the changed weights (S1200), calculating speech recognition error rates between the re-extracted speech recognition results and the input spoken sentence speech (S1300), confirming or determining a speech recognition result at which an error rate becomes the minimum among the calculated speech recognition error rates (S1400), and determining an acoustic model weight of the speech recognition result at which an error rate becomes the minimum (S1500).

When the weight of the acoustic model at which the speech recognition error rate becomes the minimum is determined, the determined weight is compared with an existing predetermined weight (S1600), and it may be determined whether the error of the speech recognition failure is due to an error by the acoustic model or an error by the language model (S1700).

If the determined weight is smaller than the previously set weight, the cause of speech recognition failure may be determined as an error due to the acoustic model (S1710) and if the determined weight is greater than the previously set weight, the cause of the speech recognition failure may be determined as an error due to the language model (S1720). In an embodiment, the determined weight is compared with a previously set weight (S1600), and whether the error of the speech recognition failure is an error due to the acoustic model or an error due to the language model is determined by whether a value obtained by subtracting an existing weight from a minimum weight of a speech recognition error rate is positive or negative by outputting the value obtained by subtracting an existing weight from a minimum weight of a speech recognition error rate. That is, if the value obtained by subtracting the existing weight from the minimum weight of the speech recognition error rate is negative, the error of the speech recognition failure is determined as an error due to the acoustic model (S1710) and if the value obtained by subtracting the existing weight from the minimum weight of the speech recognition error rate is positive, the error of the speech recognition failure may be determined as an error due to the language model (S1720).

In an embodiment of the present disclosure, when the weight of the speech recognizer is set to 0.07 and the speech is spoken as "belsoli nage haejwo (let me ring)", but recognized as "belsoli hwag-in haejwo (please check the ringtone)" and thus the recognition is failed, a speech recognition syllable error rate between the re-extracted speech recognition results and the input spoken sentence speech is calculated as 28.57% (2/7). If the weight is changed to 0.1 (S1100) and the recognition result is "belsoli nage haejwo (let me ring)", the syllable error rate is 0% (0/7). Therefore, since an error rate is reduced when the weight of the minimum error rate is 0.1 (S1500) and larger than that of the existing weight (0.07) (S1600), the error may be determined as an error due to the language model (S1720).

If it is determined that the cause of the recognition failure is due to an error due to the acoustic model or an error due to the language model, the failure cause analysis through the reliability measurement of the acoustic model is terminated (S1800).

Figure 6:
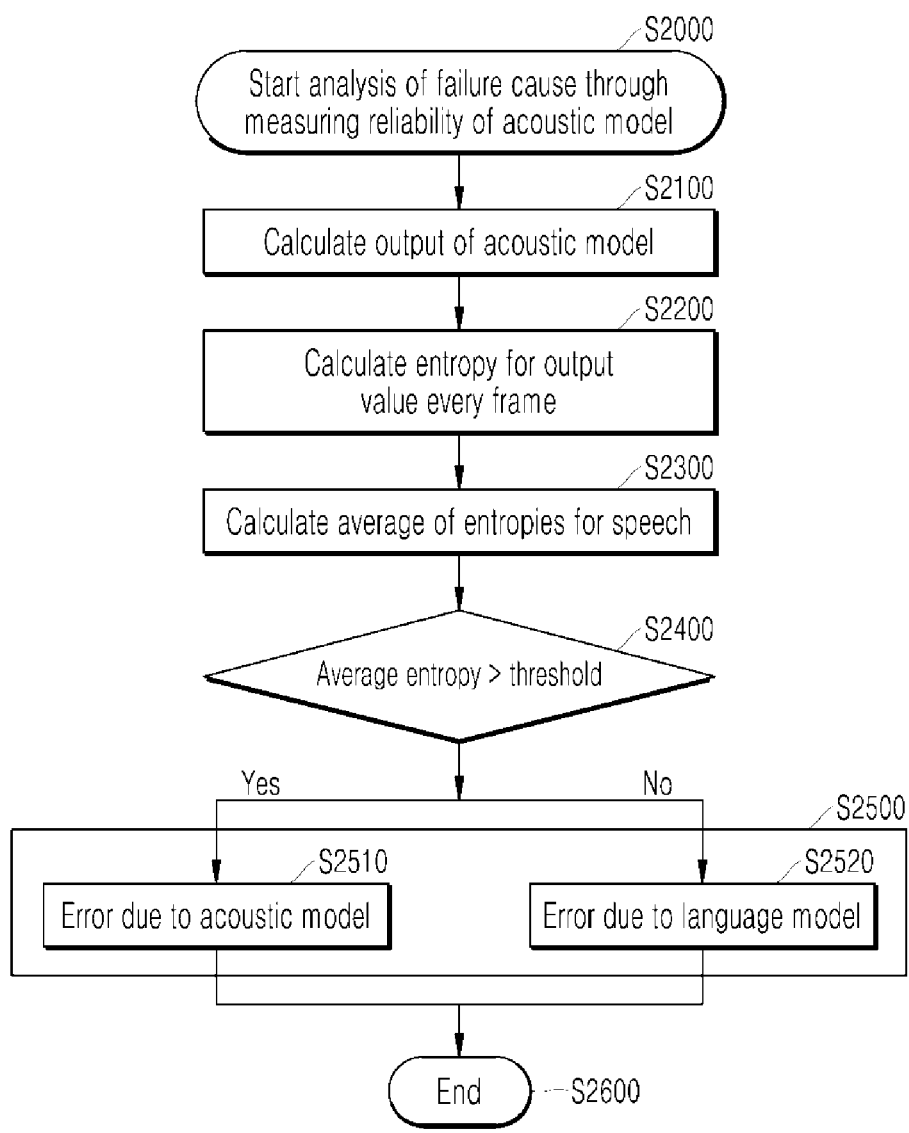
FIG. 6 is a flowchart of a method for analyzing a failure cause by measuring reliability of an acoustic model according to an embodiment of the present disclosure.

FIG. 6 is a flowchart of a method for analyzing a failure cause by measuring reliability of an acoustic model according to an embodiment of the present disclosure.

The failure cause analysis through the reliability measurement of the acoustic model is performed in the recognition failure cause analyzer 164. In the recognition failure cause analyzer 164, the analysis of the failure cause through the reliability measurement of the acoustic model is started (S2000), and it is determined whether the cause of failure is present in the acoustic model 151 or the language model 152. To this end, the recognition failure cause analyzer 164 calculates an output of the acoustic model (S2100), and calculates an entropy of an output value every frame of the output of the acoustic model to measure the reliability of the acoustic model (S2200). The output of the acoustic model represents a probability distribution in each class (ex: phoneme) for a given input value.

Then, an average of entropy for the speech is calculated (S2300), the entropy average is compared with a threshold (S2400), and it may be determined whether the cause of the recognition failure is due to an error by the acoustic model or an error by the language model (S2500).

The reliability may be calculated by calculating the entropy of the probability distribution, and the average of the entropy may be taken for the input of each frame and used to determine the reliability of the corresponding speech. If the probability distribution is concentrated on one phoneme, the entropy is small and if the entropy is small, it may be evaluated that the reliability is high. On the contrary, if the probability distribution is widespread, it may be evaluated that the entropy is large and the reliability is low. Since if the reliability of the acoustic model is high, a probability to be a correct answer is high in terms of the acoustic model, even if the acoustic model is high in reliability, a possibility that the error is caused by the language model is high. Therefore, by comparing the entropy average with the threshold, if the entropy average is smaller than the threshold, it is meant that the reliability is high. Since the speech recognition fails even though the reliability of the acoustic model is high, the speech recognition failure cause is determined as an error due to the language model (S2520), and if the entropy average is greater than the threshold, it is meant that the reliability of the acoustic model is low, and if the entropy average is greater than the threshold, the speech recognition failure cause may be determined as an error due to the acoustic model (S2510).

In another embodiment, the entropy average is compared with a threshold (S2400), and determining whether the speech recognition failure cause is the error due to the acoustic model or the error due to the language model may be performed by outputting a value obtained by subtracting the average entropy from the entropy threshold. When the value obtained by subtracting the average entropy from the entropy threshold is negative, it is meant that the entropy average is smaller than the entropy threshold and the reliability is high, and thus the speech recognition failure cause may be determined as the error due to the language model (S2520). When the value obtained by subtracting the average entropy from the entropy threshold is positive, it is meant that the entropy average is greater than the entropy threshold and the reliability is low, and thus the speech recognition failure cause may be determined as the error due to the acoustic model (S2510).

If it is determined whether the cause of the recognition failure is due to the error due to the acoustic model or the error due to the language model, the failure cause analysis is terminated by measuring the reliability of the acoustic model (S2600).

Figure 7:
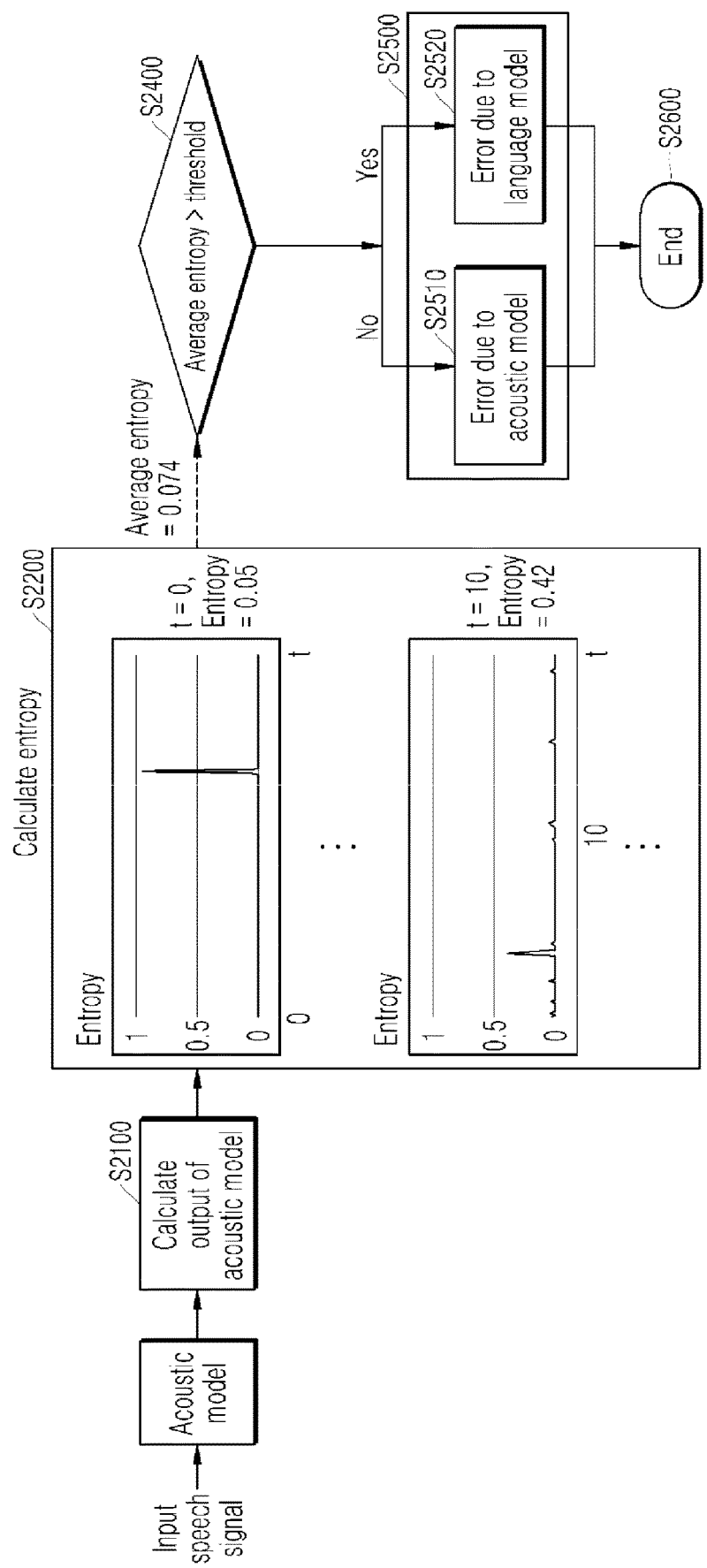
FIG. 7 is a diagram illustrating calculating an output entropy of an acoustic model according to an embodiment of the present disclosure.

FIG. 7 is a diagram illustrating calculating an output entropy of an acoustic model in the method of analyzing the failure cause through the reliability measurement of the acoustic mode of FIG. 6.

The output of each frame may be represented by the probability distribution as shown in the drawing, and the entropy may be calculated from the probability distribution. The probability distribution of FIG. 7 is a graph showing observation vector values. The entropy average of the frame unit may be calculated to evaluate the reliability of speech. In FIG. 7, the entropy is 0.05 at t=0, the entropy is 0.42 at t=10, and the average entropy is 0.074. Through experiments, if a predetermined threshold is 0.1 and the average entropy for the calculated speech is 0.074, the entropy is smaller than the threshold, so the reliability of the acoustic model is high. In this case, since the speech recognition may be regarded as a failure even if the reliability of the acoustic model is high, the speech recognition failure cause may be determined as the error due to the language model.

Figure 8:
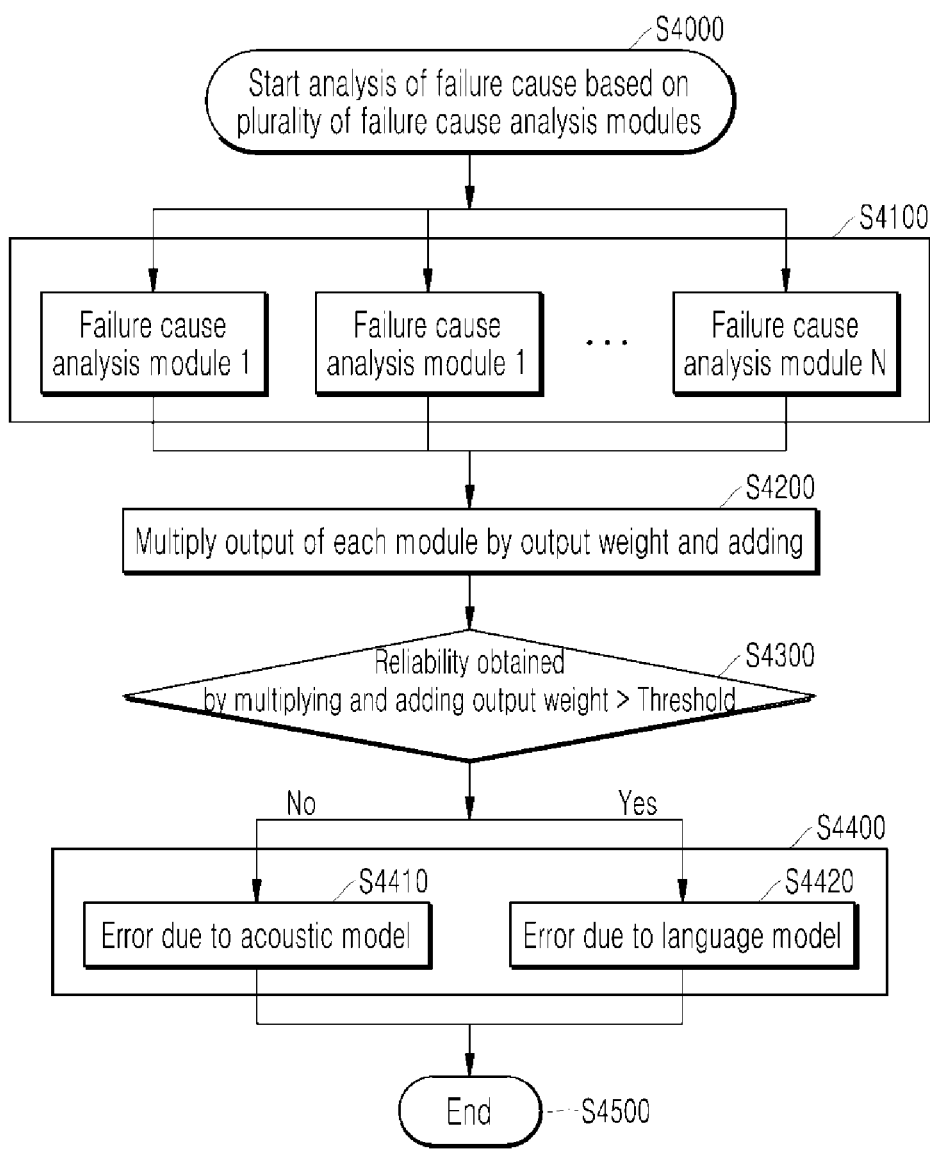
FIG. 8 is a flowchart of a method for analyzing a failure cause based on a plurality of failure cause analyzers according to an embodiment of the present disclosure.

FIG. 8 is a flowchart of a method for analyzing a failure cause based on a plurality of failure cause analyzers according to an embodiment of the present disclosure.

In an embodiment of the present disclosure, the performance of the cause analyzer may be improved by using a plurality of speech recognition failure cause analyzers together. The plurality of speech recognition failure cause analyzers may use the speech recognition failure cause analyzers of FIGS. 5 and 6.

As described in FIG. 5, the determined weight is compared with an existing weight (S1600), and determining whether the speech recognition failure cause is the error due to the acoustic model or the error due to the language model may be performed by outputting a value obtained by subtracting the existing weight from the minimum weight of the speech recognition error rate. As described in FIG. 6, the entropy average is compared with a threshold (S2400), and determining whether the speech recognition failure cause is the error due to the acoustic model or the error due to the language model may be performed by outputting a value obtained by subtracting the average entropy from the entropy threshold. When using two speech recognition failure cause determiners of a failure cause analyzer (module 1) through searching the minimum weight of the acoustic model of FIG. 5 described above and a failure cause analyzer (module 2) through measuring the reliability of the acoustic model of FIG. 6, an output of each module may be set as follows.

Output of Module 1=Minimum Weight of Speech Recognition Error Rate−Existing Weight Output of Module 2=Entropy Threshold−Average Entropy When an output value of each speech recognition failure cause analyzer is positive, the speech recognition failure cause may be set to be determined as an error due to the language model. Accordingly, a final determination value may be calculated as follows.

Final determination value for the plurality of failure cause analyzers=(Output of module 1)×a+(Output of module 2)×(1−a)

Here, a is an output weight assigned to module outputs, and the sum of all output weights may be set to be 1. When the output value of each speech recognition failure cause analyzer is positive, the speech recognition failure cause is set to be determined to be an error due to the language model, and thus when the final determination value exceeds a specific threshold, it may be determined to be an error due to the language model, and on the contrary, it may be determined as an error due to the acoustic model.

In an embodiment of the present disclosure, if there are N other speech recognition failure cause analyzers, the weights are set so that the sum of N output weights is 1 to analyze the speech recognition failure cause using the N failure cause analyzers.

The example embodiments described above may be implemented through computer programs executable through various components on a computer, and such computer programs may be recorded in computer-readable media. Here, the medium may include magnetic media such as hard discs, floppy discs, and magnetic tapes, optical media such as CD-ROM and DVD, magneto-optical media such as floptical disc, and hardware devices specially configured to store and perform program codes, such as ROM, RAM, and flash memory.

The computer programs may be those specially designed and constructed for the purposes of the present disclosure or they may be of the kind well known and available to those skilled in the computer software arts. Examples of the computer program may include not only machine language codes generated by compilers but also high-level language codes that can be executed by computers using interpreters.

As used in the present application (especially in the appended claims), the terms 'a/an' and 'the' include both singular and plural references, unless the context clearly states otherwise. Unless otherwise defined, the ranges defined herein is intended to include any invention to which values within the range are individually applied and may be considered to be the same as individual values constituting the range in the detailed description of the present disclosure.

Unless otherwise defined, the ranges defined herein is intended to include any invention to which values within the range are individually applied and may be considered to be the same as individual values constituting the range in the detailed description of the present disclosure. The present disclosure is not necessarily limited to the order of operations given in the description. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Furthermore, those skilled in the art will readily appreciate that many alternation, combination and modifications, may be made according to design conditions and factors within the scope of the appended claims and their equivalents.

The present disclosure is thus not limited to the example embodiments described above, and rather intended to include the following appended claims, and all modifications, equivalents, and alternatives falling within the spirit and scope of the following claims.

What is claimed is:

1. A speech recognition method comprising:
    receiving a speech spoken by a user;
    performing speech recognition using an acoustic model and a language model stored in a speech database;
    determining whether the speech recognition is successful;
    storing speech recognition failure data when the speech recognition fails;
    analyzing the speech recognition failure data to determine whether a cause of a speech recognition failure is due to the acoustic model or the language model; and
    updating the acoustic model by adding the speech recognition failure data to a learning database of the acoustic model when the cause of the speech recognition failure is due to the acoustic model and performing machine-learning on the acoustic model based on the learning database of the acoustic model with the added speech recognition failure data and updating the language model by adding the speech recognition failure data to a learning database of the language model when the cause of the speech recognition failure is due to the language model and performing machine-learning on the language model based on the learning database of the language model with the added speech recognition failure data,
    wherein performing the speech recognition comprises selecting a result of a highest final score among a plurality of speech recognition result candidates as a speech recognition result, wherein the highest final score is calculated by multiplying a score of the acoustic model by a weight and then adding a score of the language model, and
    wherein determining whether the cause of the speech recognition failure is due to the acoustic model or the language model comprises:
        changing weights for the score of the acoustic model,
        re-extracting speech recognition results for the speech recognition failure data according to the changed weights,
        calculating speech recognition error rates between the re-extracted speech recognition results and an input spoken text,
        determining a speech recognition result of which an error rate is a minimum among the calculated speech recognition error rates,
        determining an acoustic model weight of the speech recognition result of which the error rate is the minimum, and
        comparing the determined weight with a previously set weight to determine whether the cause of the speech recognition failure is an error due to the acoustic model or an error due to the language model.

2. The speech recognition method of claim 1, wherein comparing the determined weight with the previously set weight comprises:
    when the determined weight is smaller than the previously set weight, determining the cause of the speech recognition failure to be the error due to the acoustic model; and
    when the determined weight is larger than the previously set weight, determining the cause of the speech recognition failure to be the error due to the language model.

3. A speech recognition method comprising:
    receiving a speech spoken by a user;
    performing speech recognition using an acoustic model and a language model stored in a speech database;
    determining whether the speech recognition is successful;
    storing speech recognition failure data when the speech recognition fails;
    analyzing the speech recognition failure data to determine whether a cause of a speech recognition failure is due to the acoustic model or the language model; and
    updating the acoustic model by adding the speech recognition failure data to a learning database of the acoustic model when the cause of the speech recognition failure is due to the acoustic model and performing machine-learning on the acoustic model based on the learning database of the acoustic model with the added speech recognition failure data and updating the language model by adding the speech recognition failure data to a learning database of the language model when the cause of the speech recognition failure is due to the language model and performing machine-learning on the language model based on the learning database of the language model with the added speech recognition failure data,
    wherein analyzing the speech recognition failure data to determine whether the cause of the speech recognition failure is due to the acoustic model or the language mode comprises:
        calculating an output of the acoustic model representing a probability distribution in each class for a given input value of the acoustic model,
        calculating an entropy for an output value of every frame input of the output of the acoustic model to measure a reliability of the acoustic model,
        calculating an average of the calculated entropies,
        comparing whether the average of the entropies is greater than a threshold,
        determining the cause of the speech recognition failure to be an error due to the language model when the average of the entropies is smaller than the threshold, and
        determining the cause of the speech recognition failure to be an error due to the acoustic model when the average of the entropies is greater than the threshold.

4. The speech recognition method of claim 1, wherein analyzing the speech recognition failure data to determine whether the cause of the speech recognition failure is due to the acoustic model or the language mode comprises:
- analyzing the speech recognition failure data through a plurality of analyzing methods, multiplying an output of each analyzing method by an output weight, and comparing a final value obtained by adding the values multiplied by the output weight with a specific threshold value to determine whether the cause of the speech recognition failure is due to the acoustic model or the language model,
- wherein a sum of the multiplied weights for the output of each analyzing method is 1.

5. The speech recognition method of claim 4, wherein the plurality of analyzing methods comprise a first method of searching a minimum weight of the acoustic model and a second method of measuring a reliability of the acoustic model,
- wherein searching the minimum weight of the acoustic model comprises:
  - changing the weights for the score of the acoustic model,
  - re-extracting the speech recognition results for the speech recognition failure data according to the changed weights,
  - calculating the speech recognition error rates between the re-extracted speech recognition results and the speech,
  - determining the speech recognition result of which the error rate is the minimum among the calculated speech recognition error rates,
  - determining the acoustic model weight of the speech recognition result of which the error rate is the minimum, and
  - outputting a value obtained by subtracting an existing weight from the determined minimum weight of the speech recognition error rate,
- wherein measuring the reliability of the acoustic model comprises:
  - calculating an output of the acoustic model representing a probability distribution in each class for a given input value of the acoustic model,
  - calculating an entropy for an output value of every frame input of the output of the acoustic model to measure the reliability of the acoustic model,
  - calculating an average of the calculated entropies, and
  - outputting a value obtained by subtracting an average entropy from an entropy threshold.

6. The speech recognition method of claim 5, wherein the output through searching the minimum weight of the acoustic model and the output through measuring the reliability of the acoustic model are set to be determined as errors due to the language model when the output values are positive, respectively, and
- when a final value obtained by multiplying the output through each analyzing method by output weights and adding the outputs multiplied by the output weights is larger than a specific threshold, the cause of the speech recognition failure is determined to be the error due to the language model and when the final value is smaller than the specific threshold, the cause of the speech recognition failure is determined to be the error due to the acoustic model.

7. The speech recognition method of claim 1, wherein updating the acoustic model comprises evaluating performance of a result of machine-learning of the learned acoustic model and updating the acoustic model based on confirming improvement of a speech recognition performance of the learned acoustic model, and
- wherein updating the language model comprises evaluating performance of a result of machine-learning of the learned language model and updating the language model based on confirming improvement of a speech recognition performance of the learned language model.

8. A non-transitory machine readable storage medium including a computer program that is configured to, when executed by a processor, cause the processor to perform the method of claim 1 using a computer.

9. A speech recognition device comprising:
- at least one processor configured to:
  - receive a speech spoken by a user;
  - perform speech recognition using an acoustic model and a language model stored in a speech database;
  - analyze whether a cause of a speech recognition failure is due to the acoustic model or the language model when the speech recognition fails; and
  - control the acoustic model or the language model to be updated based on the cause of the speech recognition failure,
- wherein the at least one processor is further configured to perform the speech recognition by selecting a result of the highest final score among a plurality of speech recognition result candidates as a speech recognition result, wherein the final score is calculated by multiplying a score of the acoustic model by a weight and then adding a score of the language model,
- wherein, in analyzing whether the cause of the speech recognition failure is due to the acoustic model or the language model, the at least one processor is further configured to:
  - change weights for the score of the acoustic model,
  - re-extract speech recognition results for speech recognition failure data according to the changed weights,
  - calculate speech recognition error rates between the re-extracted speech recognition results and the speech,
  - determine a speech recognition result of which an error rate is a minimum among the calculated speech recognition error rates,
  - determine an acoustic model weight of the speech recognition result of which the error rate is the minimum, and
  - compare the determined weight with a previously set weight to determine whether the cause of the speech recognition failure is an error due to the acoustic model or an error due to the language model.

10. The speech recognition device of claim 9, wherein the at least one processor is further configured to analyze the cause of the speech recognition failure by:
- determining whether speech recognition has been successful in the speech recognizer;
- storing the speech recognition failure data based on determining that the speech recognition failed;
- determining whether a speech recognition failure cause is present in the acoustic model or the language model by analyzing the speech recognition failure data;
- adding the speech recognition failure data to a learning database of the acoustic model and performing machine-learning on the acoustic model based on the learning database of the acoustic model with the added speech recognition failure data when the speech recognition failure cause is present in the acoustic model; and adding the speech recognition failure data to a learning database of the language model and performing machine-learning on the language model based on the learning database of the language model with the added speech recognition failure data when the speech recognition failure cause is present in the language model.

11. The speech recognition device of claim 10, wherein the at least one processor is further configured to analyze the cause of the speech recognition failure by at least one of searching a minimum weight of the acoustic model or measuring a reliability of the acoustic model, and wherein measuring the reliability of the acoustic model comprises:

calculating an output of the acoustic model representing a probability distribution in each class for a given input value of the acoustic model, calculating an entropy for an output value of every frame input of the output of the acoustic model to measure the reliability of the acoustic model, calculating an average of the calculated entropies, and comparing whether the average of the calculated entropies is larger than a threshold to determine whether the failure cause is an error due to the language model or an error due to the acoustic model.

12. The speech recognition device of claim 11, wherein the at least one processor is further configured to analyze the cause of the speech recognition failure by:

analyzing the speech recognition failure data based on a plurality of analyzing methods that include a first analyzing method performed through searching the minimum weight of the acoustic model and a second analyzing method performed through measuring the reliability of the acoustic model; and comparing a final value obtained by multiplying an output of each speech recognition failure cause analysis result by output weights and adding the values multiplied by the output weights with a specific threshold to determine whether the cause of the speech recognition failure is due to the acoustic model or the language model, and wherein a sum of the multiplied weights for the output of each speech recognition failure cause analysis result is 1.

13. The speech recognition device of claim 12, wherein the at least one processor is further configured to:

determine whether the cause of the speech recognition failure is the error due to the acoustic model or the error due to the language model through searching the minimum weight of the acoustic model by outputting a value obtained by subtracting an existing weight from the minimum weight of the speech recognition error rate; and determine whether the cause of the speech recognition failure is the error due to the acoustic model or the error due to the language model through measuring the reliability of the acoustic model by outputting a value obtained by subtracting an average entropy from an entropy threshold.

14. The speech recognition device of claim 13, wherein the at least one processor is further configured to:

when the value obtained by subtracting the existing weight from the minimum weight of the speech recognition error rate which is the output through searching the minimum weight of the acoustic model and the value obtained by subtracting an average entropy from an entropy threshold which is the output through measuring the reliability of the acoustic model are positive, determine the cause of the speech recognition failure to be errors due to the language model;

when a final value obtained by multiplying the output through each analyzing method by output weights and adding the outputs multiplied by the output weights is larger than a specific threshold, determine the cause of the speech recognition failure to be the error due to the language model; and when the final value is smaller than the specific threshold, determine the cause of the speech recognition failure to be the error due to the acoustic model.

15. The speech recognition device of claim 10, wherein the at least one processor is further configured to:

evaluate performance of a result of machine-learning based on the acoustic model and the language model.

16. The speech recognition device of claim 15, wherein the at least one processor is further configured to, based on confirming that the performance of the result of machine-learning based on the acoustic model and the language model is improved, control the acoustic model or the language model to be updated to a model learned by the acoustic model or the language model.

* * * * *